US012516203B2

(12) United States Patent
Harries et al.

(10) Patent No.: US 12,516,203 B2
(45) Date of Patent: Jan. 6, 2026

(54) INK COMPOSITION

(71) Applicant: Domino Printing Sciences Plc, Cambridge (GB)

(72) Inventors: Josephine Harries, Cambridge (GB); Natasha Jeremic, Cambridge (GB); Simon Goddard, Cambridge (GB); Amber Johnson, Cambridge (GB); Thomas Lake, Cambridge (GB); Yuichi Matsushita, Cambridge (GB); Martin Thompson, Cambridge (GB); Andrew Kyriacou, Cambridge (GB)

(73) Assignee: Domino Printing Sciences PLC, Cambridge (GB)

( * ) Notice: Subject to any disclaimer, the term of this patent is extended or adjusted under 35 U.S.C. 154(b) by 966 days.

(21) Appl. No.: 17/422,951

(22) PCT Filed: Jan. 17, 2020

(86) PCT No.: PCT/EP2020/051166
§ 371 (c)(1),
(2) Date: Jul. 14, 2021

(87) PCT Pub. No.: WO2020/148441
PCT Pub. Date: Jul. 23, 2020

(65) Prior Publication Data
US 2022/0073767 A1 Mar. 10, 2022

(30) Foreign Application Priority Data
Jan. 18, 2019 (GB) .................................. 1900725

(51) Int. Cl.
| | | |
|---|---|---|
| *C09D 11/00* | (2014.01) | |
| *C08K 5/5313* | (2006.01) | |
| *C08K 5/5397* | (2006.01) | |
| *C09D 11/037* | (2014.01) | |
| *C09D 11/101* | (2014.01) | |
| *C09D 11/107* | (2014.01) | |
| *C08F 220/18* | (2006.01) | |
| *C08F 220/28* | (2006.01) | |
| *C08F 222/10* | (2006.01) | |
| *C08F 226/02* | (2006.01) | |

(52) U.S. Cl.
CPC .......... *C09D 11/101* (2013.01); *C08K 5/5313* (2013.01); *C08K 5/5397* (2013.01); *C09D 11/037* (2013.01); *C09D 11/107* (2013.01); *C08F 220/1807* (2020.02); *C08F 220/285* (2020.02); *C08F 222/102* (2020.02); *C08F 226/02* (2013.01)

(58) Field of Classification Search
CPC ... C09D 11/101; C09D 11/037; C09D 11/107; C08K 5/5313; C08K 5/5397; C08F 220/102; C08F 222/102; C08F 220/285; C08F 226/02

USPC ...................... 106/31.01, 31.13, 31.6, 31.86
See application file for complete search history.

(56) References Cited

U.S. PATENT DOCUMENTS

| | | |
|---|---|---|
| 9,139,748 B2 | 9/2015 | Mizutani |
| 9,587,126 B2 | 3/2017 | Mizutani |
| 9,598,591 B2 | 3/2017 | Mizutani et al. |
| 2012/0113201 A1 | 5/2012 | Kagose et al. |
| 2012/0274717 A1 | 11/2012 | Nakano et al. |
| 2013/0258018 A1 | 10/2013 | Nakajima et al. |
| 2015/0094394 A1 | 4/2015 | Jung et al. |
| 2015/0125673 A1 | 5/2015 | Toyoda |
| 2015/0284579 A1 | 10/2015 | Mizutani et al. |
| 2017/0011423 A1 | 1/2017 | Douglas et al. |
| 2017/0321075 A1 | 11/2017 | Nakano et al. |

FOREIGN PATENT DOCUMENTS

| | | | |
|---|---|---|---|
| CN | 102757693 A | 10/2012 | |
| CN | 103358742 A | 10/2013 | |
| CN | 104797665 A | 7/2015 | |
| CN | 106590167 A | 4/2017 | |
| CN | 108373658 A | 8/2018 | |
| CN | 108504189 A | 9/2018 | |
| EP | 1788045 A1 | 5/2007 | |
| EP | 2070998 A1 | 6/2009 | |
| EP | 2644405 A1 * | 10/2013 | .............. B41M 5/00 |
| EP | 2 913 370 A1 | 2/2015 | |
| EP | 2832805 A1 | 2/2015 | |
| EP | 3101072 A1 | 12/2016 | |

(Continued)

OTHER PUBLICATIONS

Japanese Office Action issued Jul. 18, 2023 on 2021-541570 and English translation.
UKIPO Search Report dated Jul. 9, 2019 issued in Application No. 1900725.1.
International Search Report dated Mar. 25, 2020 issued in Application No. PCT/EP2020/051166.
Chinese Search Report dated Jul. 7, 2022 on 202080016004.2 and English translation.
Chinese Office Action dated Jul. 18, 2022 202080016004.2 and English translation.

(Continued)

*Primary Examiner* — James E McDonough
(74) *Attorney, Agent, or Firm* — Stites & Harbison PLLC; Richard S. Myers, Jr.

(57) ABSTRACT

Provided is an ink composition for use in drop on demand inkjet printing such as piezoelectric drop on demand inkjet printing. The ink composition has a phosphine oxide initiator and benzyl acrylate. The amount of benzyl acrylate is less than 40 wt % based on the total weight of the ink composition and the total amount of mono-functional monomers is less than 45 wt % based on the total weight of the ink composition. The phosphine oxide initiator is a bis-acyl phosphine oxide, a benzoyl alkyl phosphinate, or a mixture thereof. The ink compositions are suitable for radiation curing and have good cure properties or good adhesion properties.

22 Claims, No Drawings

(56) References Cited

FOREIGN PATENT DOCUMENTS

| | | |
|---|---|---|
| EP | 3 263 656 A1 | 1/2018 |
| JP | 2012-126885 A | 7/2012 |
| JP | 2012-201847 A | 10/2012 |
| JP | 2012-255045 A | 12/2012 |
| WO | WO 2013/146062 A1 | 10/2013 |
| WO | WO 2014/065362 A1 | 5/2014 |
| WO | WO 2014/126720 A1 | 8/2014 |

OTHER PUBLICATIONS

Chinese Office Action dated Mar. 31, 2023 on 202080016004.2 and English translation.
Indian Office Action dated Feb. 15, 2023 on 202117031527 (dual language).

* cited by examiner

INK COMPOSITION

CROSS REFERENCE TO RELATED APPLICATIONS

This application is a § 371 National State Application of PCT/EP2020/051166 filed Jan. 17, 2020 which claims priority to GB 1900725.1 filed Jan. 18, 2019.

FIELD OF THE INVENTION

The present invention relates an ink composition, in particular an ink composition for radiation curing, for example, UV curing.

BACKGROUND OF THE INVENTION

In ink compositions a number of factors must be balanced in order to avoid or reduce the problems associated with ink compositions.

For curable inks, one or more monomers are present in the ink typically with a polymerization initiator, such as a photoinitiator. After the ink composition is printed, the monomers polymerise to provide the cured printed deposit. The polymerization process is often referred to as curing, in the case of UV curable inks, the curing process involves treating the printed ink composition with UV radiation for example UV light from a light-emitting diode (LED) or mercury vapour arc lamp.

The monomers may be mono-functional or multi-functional (e.g. di-functional or tri-functional) monomers. In the case of UV curing the polymerization initiator is typically a photoinitiator.

Phosphine oxide initiators are a well-known class of photoinitiator. Phosphine oxide initiators typically have only partial solubility in the common monomers used in UV curable inks. This limits the amount of the photoinitiator that can be loaded into the formulation. The amount of photoinitiator is one factor that may affect the cure performance of the ink.

Commonly used phosphine oxide initiators include diphenyl (2,4,6-trimethylbenzoyl) phosphine oxide (TPO). TPO is classified as a CMR substance (carcinogenic, mutagenic or toxic for reproduction) and it is known to be damaging to fertility. TPO is generally not suitable for inks to be used in food packaging.

If the cure of an ink is poor, offsetting of the resulting printed deposit can occur. In the case of roll to roll printing, the printed deposit may be offset onto the rollers. Further offset from the rollers onto a clean surface of the substrate produces "image ghosting" which results in the poor print quality. Undesirable image ghosting can be observed in other types of printing in a similar manner.

When the printed substrate is intended for use in food packaging, offsetting can cause additional problems. For example, offsetting on the inner side of the packaging poses the problem of transfer or migration of the ink to the food (see WO 2014/126720).

As well as poor surface cure, poor adhesion of the ink can also result in ink offset. Poor surface cure can cause the top layer of the ink to transfer when it is contacted with another surface. Poor adhesion can cause the ink to lift off the printed substrate at the ink-substrate interface, resulting in transfer of the whole film (see EP1788045 and EP2070998).

Another problem encountered with curable inkjet inks is that pigments can shield the photoinitiators from the UV light. As a result, the cure and subsequent print quality are often poor. This is particularly the case for dark pigments such as carbon black pigments.

It is desirable that inks, for example those used in radiation curing, have good cure properties and good adhesion to the substrate.

It is an object of the present invention to provide compounds for ink compositions that have some of the above desirable characteristics. In particular, it is an object of the invention to provide compounds for ink composition which have a combination of good curing properties and good adhesion.

It is an alternative and/or additional object of the present invention to overcome or address the problems of prior art ink compositions by using the compounds of the invention or to at least provide a commercially useful alternative thereto.

SUMMARY OF THE INVENTION

The present invention seeks to provide an ink composition which is suitable for radiation curing and has good cure properties and/or good adhesion properties. In particular, the present invention seeks to provide an inkjet ink composition for use in drop on demand inkjet printing such as piezoelectric drop on demand inkjet printing.

Accordingly, in one aspect the present invention provides an ink composition comprising a phosphine oxide initiator and benzyl acrylate. The amount of benzyl acrylate is less than 40 wt % based on the total weight of the ink composition and the total amount of mono-functional monomers is less than 45 wt % based on the total weight of the ink composition. The phosphine oxide initiator is a bis-acyl phosphine oxide such as dibenzoyl phosphine oxide, a benzoyl alkyl phosphinate, or a mixture thereof.

In this way, an ink composition with good cure and adhesion properties is provided. In particular, the inks provide good cure and adhesion even when dark pigments such as carbon black are used in the ink compositions. The compositions are therefore particularly suited for printing onto food packaging It is proposed that benzyl acrylate promotes the solubility of the phosphine oxide initiator by TT electron interactions which sufficiently disrupt the crystal structure. It is believed that benzyl acrylate also gives the phosphine oxide initiator improved mobility by providing a lower viscosity to the ink compositions. The increased solubility and mobility of the phosphine oxide initiator improves the cure rate.

It is also proposed that the limit on the total amount of mono-functional monomers and the limit on the total amount of benzyl acrylate provides an ink composition that has good adhesion.

In another aspect the present invention provides a printed deposit formed from the ink composition of the invention. The printed deposit comprises a cured polymer film formed by polymerisation of benzyl acrylate and any other monomers present in the ink composition.

The ink composition is compatible with the components of a printer, for example an inkjet printer, and more particularly a drop on demand inkjet printer, such as a piezoelectric drop on demand inkjet printer. The ink composition is suitable for application directly onto products and/or product packaging to achieve high quality images.

Preferably the ink composition described herein has a viscosity of about 0.5 to 30 mPa·s, more preferably from 1 to 20 mPa·s and even more preferably from 5 to 20 mPa·s at 25° C.

Preferably the ink composition described herein has a viscosity of less than 25 mPa·s, more preferably less than 15 mPa·s at 25° C. Preferably the ink composition described herein has a viscosity of greater than 5 mPa·s, more preferably greater than 8 mPa·s, even more preferably greater than 10 mPa·s at 25° C. The viscosity of the composition may be measured using a viscometer such as a Brookfield DV-II+viscometer.

The Brookfield DV-II+viscometer is a rotational viscometer which measures viscosity by measuring the torque required to turn an object in a fluid as a function of the fluid's viscosity.

Preferably the ink composition as described herein has a surface tension of from 20 to 50 mN/m, more preferably from 20 to 40 mN/m at 25° C. The surface tension of the composition may be measured using equipment such as a du Nouy ring tensiometer or using the pendant drop method on a KSV Cam 200 optical tensiometer.

DETAILED DESCRIPTION

The present invention seeks to provide an ink composition which is suitable for radiation curing and has good cure properties and/or good adhesion properties. In particular, the present invention seeks to provide an inkjet ink composition for use in drop on demand inkjet printing such as piezo-electric drop on demand inkjet printing.

Accordingly, in one aspect the present invention provides an ink composition comprising a phosphine oxide initiator and benzyl acrylate. The amount of benzyl acrylate is less than 40 wt % based on the total weight of the ink composition and the total amount of mono-functional monomers is less than 45 wt % based on the total weight of the ink composition. The phosphine oxide initiator is a bis-acyl phosphine oxide such as a dibenzoyl phosphine oxide, a benzoyl alkyl phosphinate, or a mixture thereof.

The ink composition may be an inkjet ink composition. The ink composition may be a UV curable ink composition for example a UV curable inkjet ink composition, in particular for use in drop on demand inkjet printing.

In another aspect the present invention provides a printed deposit formed from the ink composition of the invention. The printed deposit comprises a cured polymer film formed by polymerisation of the benzyl acrylate and any other monomers present in the ink composition.

The inks of the present invention are preferably for use with a piezoelectric inkjet printer such as a piezoelectric drop on demand inkjet printer. The viscosity and surface tension of the ink will be dependant up on droplet size ejected by the printer and may be adjusted within the formulation principle disclosed to best suit the properties of the printer.

Typically in such printers, ink may be heated to around 40° C. to reduce the viscosity and facilitate ejection through the nozzles. For such applications the viscosity is preferably from 5 to 10 mPa·s at the temperature of application, for example at 40° C.

The ink of the present invention may be useful for use in high speed printing applications. Such applications require the ejection of droplets at very high frequency from the nozzles of the printer and the residence time under the UV curing equipment is reduced at high speed. The inks of the present invention have low viscosities which are required for high speed ejection and exhibit improved cure allowing high speed curing processes. Preferably the ink should be capable of print speeds up to 50 m/min, more preferably 75 m/min.

In some cases the inks of the current invention may be for use in a continuous inkjet (CIJ) printer. For such applications low viscosities are typically used. For example, the viscosity is preferably from 2 to 8 mPas at 25° C. In some cases, the ink of the current invention for use in CIJ printing may require the addition of organic solvent to adjust the viscosity. For CIJ inks, the ink has a conductivity, preferably the conductivity is more than about 200 uS/cm and more preferably more than about 600 uS/cm, as measured at 25° C.

Benzyl Acrylate

The ink composition contains benzyl acrylate. Benzyl acrylate is a known chemical compound having the following structure:

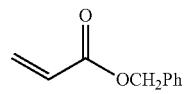

Benzyl acrylate may be referred to by the following names: Benzyl 2-propenoate; Acrylic acid benzyl; benzyl prop-2-enoate; Lipid benzylacrylate; Propenoic acid benzyl; Phenylmethyl acrylate; propenoicacidbenzylester; Acrylic acid phenylmethyl; or Acrylic acid benzyl ester. Benzyl acrylate has a CAS number of 2495-35-4.

The amount of benzyl acrylate in the ink composition is less than 40 wt % based on the total weight of the ink composition.

Preferably, the benzyl acrylate is present at 35 wt % or less based on total weight of the ink composition, more preferably 30 wt % or less and even more preferably 25 wt % or less.

Preferably, the benzyl acrylate is present at 1.0 wt % or more based on total weight of the ink composition, preferably 10 wt % or more, and even more preferably 20 wt % or more.

The benzyl acrylate may be present in an amount that is in a range with the upper and lower limits selected from the amounts described above. For example, the benzyl acrylate may be present at 10 to 35 wt % based on total weight of the ink composition.

Phosphine Oxide Initiator

The ink composition contains a phosphine oxide initiator. The phosphine oxide initiator is a bis-acyl phosphine oxide such as a dibenzoyl phosphine oxide (e.g. phenylbis(2,4,6-trimethylbenzoyl) phosphine oxide), a benzoyl alkyl phosphinate such as ethyl (2,4,6-trimethylbenzoyl)phenylphosphinate or a mixture thereof.

The use of such initiators makes it possible to enhance the curability of the ink composition for inkjet printing of the present invention when the composition is irradiated with light, for example light from a light-emitting diode (LED) or a mercury vapour arc lamp.

The term initiator used in this context refers to a photoinitiator. A photoinitiator is a compound that undergoes a photoreaction on absorption of light, producing reactive species. Photoinitiators are capable of initiating chemical reactions that result in significant changes in the solubility and physical properties of suitable formulations. In the present case the initiator is a phosphine oxide based initiator.

In the present case, the phosphine oxide initiator may function as a photoinitiator when irradiated with light having a wavelength within the range of 450 to 300 nm. This may mean that the phosphine oxide initiator has light absorption characteristics in the entire wavelength range of 450 to 300 nm.

The term bis-acyl phosphine oxide refers to a phosphine oxide having two acyl groups (—C(=O)R') covalently bonded to the phosphorus atom including, for example, phenylbis(2,4,6-trimethylbenzoyl) phosphine oxide.

The term dibenzoylphosphine oxide refers to a phosphine oxide having two benzoyl groups (—C(=O)CH$_2$Ph) covalently bonded to the phosphorus atom including, for example, phenylbis(2,4,6-trimethylbenzoyl) phosphine oxide. The group dibenzoylphosphine oxide is a sub-set of the group bis-acyl phosphine oxide wherein R' is benzyl.

The term benzoyl alkyl phosphinate refers to a phosphine oxide having one benzoyl group (—C(=O)CH$_2$Ph) covalently bonded to the phosphorus atom and one alkyl group (e.g. C$_{1-10}$alkyl) bonded to the phosphorus atom via an oxygen atom (i.e. —P—OR where R is the alkyl group), for example ethyl (2,4,6-trimethylbenzoyl)phenylphosphinate.

In some cases, the phosphine oxide initiator is phenylbis(2,4,6-trimethylbenzoyl) phosphine oxide. Phenylbis(2,4,6-trimethylbenzoyl) phosphine oxide is sold under the product name Omnirad 819.

In some cases, the phosphine oxide initiator is a mixture of phenylbis(2,4,6-trimethylbenzoyl) phosphine oxide and ethyl (2,4,6-trimethylbenzoyl)phenylphosphinate. Ethyl (2,4,6-trimethylbenzoyl)phenylphosphinate is sold under the product name TPO-L Preferably, the phosphine oxide initiator is present at 20 wt % or less based on total weight of the ink composition, more preferably 15 wt % or less and even more preferably 10 wt % or less.

Preferably, the phosphine oxide initiator is present at 0.1 wt % or more based on total weight of the ink composition, preferably 1 wt % or more or 3 wt % or more, and even more preferably 6 wt % or more.

The phosphine oxide initiator may be present in an amount that is in a range with the upper and lower limits selected from the amounts described above. For example, the phosphine oxide initiator may be present at 3 to 10 wt % based on total weight of the ink composition.

Mono-Functional Monomers

The ink composition comprises benzyl acrylate. Benzyl acrylate is a mono-functional monomer. The ink composition may further comprise additional mono-functional monomers.

The total amount of mono-functional monomers in the ink composition is less than 45 wt % based on the total weight of the composition. That is, the amount of benzyl acrylate and any other mono-functional monomers in the ink composition combined is less than 45 wt % based on the total weight of the composition.

The term 'mono-functional monomer' used in this context refers to a monomer having exactly one functional group that can undergo polymerization, such as radical polymerisation.

Preferably the mono-functional monomer comprises an alkenyl, alkynyl, acrylate, maleate, fumarate or acrylamide functional group.

Suitable additional mono-functional monomers include mono-functional acrylates, mono-functional acrylamides, mono-functional vinyl compounds, mono-functional methacrylates, mono-functional allyl ethers, mono-functional maleates, mono-functional fumarates, and mono-functional methacrylamides. Preferably, the additional mono-functional monomer is selected from mono-functional acrylates, mono-functional acrylamides and mono-functional vinyl compounds.

Suitable monofunctional acrylate include as caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate, isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloxyethylphthalic acid, 2-acryloxyethyl-2-hydroxyethyl-phthalic acid, lactone modified flexible acrylate, or t-butylcyclohexyl acrylate.

Suitable mono-functional acrylamides include acryloyl morpholine, N-isopropyl acrylamide, N-tert-butyl acrylamide, diacetone acrylamide.

Suitable mono-functional vinyl compounds include vinyl ethers such as ethyl vinyl ether, n-butyl vinyl ether, iso-butyl vinyl ether, cyclohexyl vinyl ether, 2-ethylhexyl vinyl ether, dodecyl vinyl ether, octadecyl vinyl ether, or hydroxybutyl vinyl ether and vinyl amides such as N-vinyl caprolactam, N-vinyl pyrrolidone, N-methyl-N-vinyl acetamide, prN-vinyl imidazole.

Preferably, the additional mono-functional monomers are present at 30 wt % or less based on total weight of the ink composition, more preferably 20 wt % or less or 10 wt % or less and even more preferably 5 wt % or less.

Preferably, the additional mono-functional monomers are present at 0.1 wt % or more based on total weight of the ink composition, preferably 1 wt % or more, and even more preferably 2 wt % or more.

The additional mono-functional monomers may be present in an amount that is in a range with the upper and lower limits selected from the amounts described above. For example, the additional mono-functional monomers may be present at 0.1 to 5 wt % based on total weight of the ink composition.

Additional Initiators

The ink composition may further comprise additional initiators.

The term 'additional initiators' used in this context refers to initiators that are present in combination with the phosphine oxide initiators. That is, the term additional initiators does not include a bis-acyl phosphine oxide, a benzoyl alkyl phosphinate or a mixture thereof.

The additional initiators may be benzil ketals, α-hydroxyalkyphenones (such as α-hydroxyacetophenones, for example, difunctional alpha hydroxyl ketone or 2-hydroxy-1-[4-[[4-(2-hydroxy-2-methyl-propanoyl)phenyl]methyl] phenyl]-2-methyl-propan-1-one, discussed below), α-amino acetophenones, mono-acylphosphine oxides (such as TPO), benzophenones (such as difunctional ketosulphone, discussed below), ketosulphones, thioxanthones (such as a di-ester of carboxymethoxy thioxanthone), benzoylformate esters or a mixture thereof. Preferably, the additional initiator(s) are selected from difunctional ketosulphone, 2-hydroxy-1-[4-[4-(2-hydroxy-2-methyl-propanoyl)phenyl] methyl]phenyl]-2-methyl-propan-1-one, di-ester of carboxymethoxy thioxanthone, difunctional alpha hydroxyl ketone, or mixtures therefore. Even more preferably, the additional initiator is a mixture of difunctional ketosulphone, di-ester of carboxymethoxy thioxanthone and difunctional alpha hydroxyl ketone.

In some embodiments the additional initiator may be an oligomeric initiator, for example, an active initiator such as the initiator discussed above may be appended to an inert backbone such as PEG.

Difunctional alpha hydroxyl ketone is a known chemical compound having CAS number 71868-15-0 with the following formula:

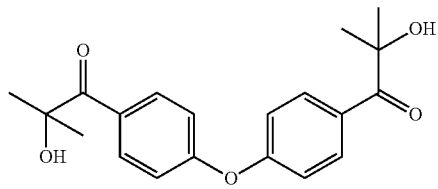 [SMILES: CC(C)(O)C(=O)c1ccc(Oc2ccc(C(=O)C(C)(C)O)cc2)cc1]

2-hydroxy-1-[4-[4-(2-hydroxy-2-methyl-propanoyl)phenyl]methyl]phenyl]-2-methyl-propan-1-one is a known chemical compound having CAS number 474510-57-1 with the following formula:

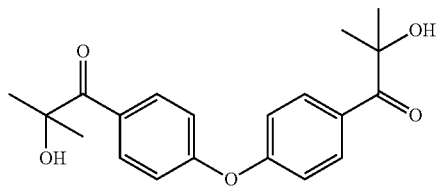 [SMILES: CC(C)(O)C(=O)c1ccc(Oc2ccc(C(=O)C(C)(C)O)cc2)cc1]

Difunctional ketosulphone is a known chemical compound having CAS number 272460-97-6 with the following formula:

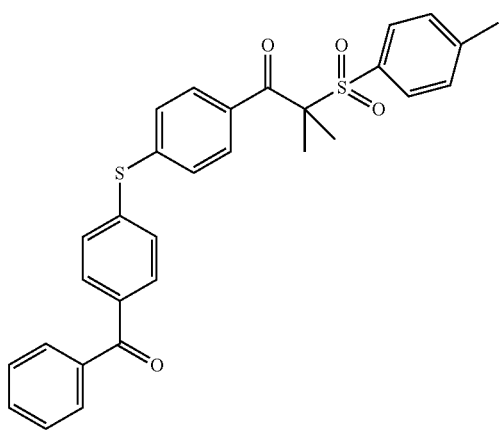 [SMILES: Cc1ccc(S(=O)(=O)C(C)(C)C(=O)c2ccc(Sc3ccc(C(=O)c4ccccc4)cc3)cc2)cc1]

Preferably, the total amount of the additional initiators is 20 wt % or less based on total weight of the ink composition, more preferably 15 wt % or less and even more preferably 10 wt % or less.

Preferably, the total amount of the additional initiators is 3 wt % or more based on total weight of the ink composition, preferably 5 wt % or more, and even more preferably 6 wt % or more.

The total amount of the additional initiators may be an amount that is in a range with the upper and lower limits selected from the amounts described above. For example, the total amount of the additional initiators is 6 to 10 wt % based on total weight of the ink composition.

Multi Functional Monomers

The ink composition may further comprise multi-functional monomers for example di- or tri-functional monomers.

The term 'multi-functional monomer' used in this context refers to monomers having two or more (i.e. more than one) functional group that can undergo polymerization.

For example, the multi-functional monomer may have two or more functional groups selected from an alkenyl, alkynyl, acrylate, maleate, fumarate or acrylamide functional group.

Preferably, the multifunctional monomer may be a multi-functional acrylate monomer or a multi-functional vinyl monomer.

Suitable multi-functional acrylate monomers include hexanediol diacrylate (e.g. 1,6-hexanediol diacrylate), 3-methyl-1,5-pentanediyl diacrylate, di-trimethylolpropane tetraacrylate, dipentaerythritol pentaacrylate, dipentaerythritol hexaacrylate, ethoxylated pentaeryhtitol tetraacrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, ethoxylated pentaerythritol tetraacrylate, glyceryl propoxy triacrylate, or caprolactam modified dipentaerythritol hexaacrylate.

Suitable multi-functional vinyl monomers include 1,4-butanediol divinyl ether, diethyleneglycol divinyl ether, triethyleneglycol, divinyl ether, polyethyleneglycol divinyl ether, 1,4-cyclohexanedimethanol divinyl ether.

Preferably, the multi-functional monomer is hexanediol diacrylate such as 1,6-hexanediol diacrylate.

Preferably, the multi-functional monomers are present at 70 wt % or less based on total weight of the ink composition, more preferably 65 wt % or less and even more preferably 60 wt % or less.

Preferably, the multi-functional monomers are present at 20 wt % or more based on total weight of the ink composition, preferably 35 wt % or more or 50 wt % or more, and even more preferably 60 wt % or more.

The multi-functional monomers may be present in an amount that is in a range with the upper and lower limits selected from the amounts described above. For example, the multi-functional monomers may be present at 60 to 70 wt % based on total weight of the ink composition.

Amine Functional Materials

The inks of the present invention may further comprise an amine compound.

The inks of the current formulation may have low viscosity, for example, to increase compatibility with drop on demand printers such as piezoelectric drop on demand printer. The low viscosity may be due to the benzyl acrylate.

Low viscosity formulations are particularly susceptible to oxygen inhibition because the oxygen can diffuse more rapidly into the printed film. The presence of oxygen interferes with the proper propagation of the free radical reactions so that cure may not be complete, particularly on the surface of the ink after exposure to UV light.

It is proposed that, amines provide a source of abstractable hydrogen atoms to quench reactive oxygen species. It is also proposed that amines recycle the peroxy radicals that are formed as a consequence of reaction with oxygen. This means that the radicals are not lost to the system, but are returned, via the amine, in a form that can support further polymerisation.

In this way, the presence of an amine may improve curing performance. It is also proposed that amine compounds, in particular oligomeric amine compounds, contribute positively to the toughness and adhesion of the cured ink film.

The amine compound may be any type of amine containing compound such as a small molecule amine, an amine functional oligomer or an amine functional polymer. The amine may be a primary, secondary or tertiary amine. A primary amine is an amines having one non-hydrogen substituent (i.e. $NRH_2$); a secondary amine is an amide having two non-hydrogen substituents (i.e. NRR'H); a tertiary amine is an amine having three non-hydrogen substituents (i.e. NRR'R"). Preferably, the amine is a secondary or tertiary amine, more preferably a tertiary amine.

Preferably, the amine compound is an amine acrylate or an amine oligomer. In some cases, the amine acrylate is an amine functional acrylate oligomer. Examples of amine functional acrylates include aminated polyether acrylate oligomers (such as Ebecryl 7100 and Ebecryl LEO10552). Examples of amine oligomers include Genomer 5695 and Genomer 5275.

Preferably, the amine compound has a molecular weight, such as a weight average molecular weight (Mw) between 200 and 10,000, more preferably between 200 and 5,000, more preferably between 500 and 5,000, more preferably between 200 and 1,000 and even more preferably between 500 and 1,000.

Preferably, the amine compound is present in less than 25 wt % based on total weight of the ink composition, more preferably less than 15 wt % and even more preferably less than 10 wt %.

Preferably, the amine compound is present in greater than 1 wt % based on total weight of the ink composition, preferably greater than 2 wt %, and even more preferably greater than 5 wt %.

The amine compound may be present in an amount that is in a range with the upper and lower limits selected from the amounts described above.

Solvents

The inks of the present invention may comprise a solvent such as an organic solvent, water or a mixture thereof. In this way, the viscosity of the ink can be further reduced or the conductivity of the ink can be enhanced, for example, for use in CIJ printing.

The organic solvent may be selected from acetone, methyl ethyl ketone, methyl propyl ketone, methyl isobutyl ketone, cyclohexanone, ethanol, isopropanol, n-propanol, isobutanol, n-butanol, sec-butanol, methyl acetate, ethyl acetate, n-propyl acetate, isopropyl acetate, n-butyl acetate, isobutyl acetate, t-butyl acetate, n-amyl acetate, isoamyl acetate, isobutyl isobutyrate, ethylene glycol, propylene glycol, 1-methoxy-2-propanol and 1-methoxy-2-propyl acetate, dimethyl carbonate, propylene carbonate, dimethyl succinate, dimethyl glutarate, dimethyl adipate, butyl diglycol acetate or a mixture thereof.

The solvent may be present at less than 50 wt % based on total weight of the ink composition, more preferably less than 30 wt % and even more preferably less than 25 wt %.

In some cases, the solvent is present at greater than 10 wt % based on total weight of the ink composition, preferably greater than 30 wt %, and even more preferably greater than 50 wt %. The solvent may be present at an amount that is in a range with the upper and lower limits selected from the amounts described above.

If water is present, it may be present at 10 wt % or less based on the total weight of the ink composition, and preferably present at 5 wt % or less, and even more preferably 1 wt % or less based on the total weight of the ink composition.

In some cases, for example in inks for use in drop on demand printing, the solvent may be present in lower amounts. In these cases, the solvent may be present at less than 5 wt % based on total weight of the ink composition, more preferably less than 3 wt % and even more preferably less than 1.5 wt %. In these cases, the solvent may be present at greater than 0.01 wt % based on total weight of the ink composition, preferably greater than 0.1 wt %, and even more preferably greater than 0.5 wt %.

Preferably inks of the invention are substantially free from volatile organic solvents and water. In particular, when the inks of the invention are for drop on demand inkjet printing such as piezoelectric drop on demand inkjet printing the inks are preferably free from volatile organic solvents and water.

Colourant

The ink composition and the printed deposit may comprise a colourant. The colourant is not particularly limited and any suitable colourant known in the art may be used.

The colourant may be a dye or a pigment. Preferably the colourant is a pigment. The pigment may be an inorganic or an organic pigment.

Preferably the pigment has an average particle size of less than 1 µm. The average particle size referred to here is the Z average particle size calculated using dynamic light scattering. This is the intensity weighted mean hydrodynamic size of the collection of particles.

The organic pigments may be selected from azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, aniline black and carbon black.

Carbon blacks for use in the ink of the present invention include carbon blacks manufactured by Mitsubishi Chemical Corporation, for example, No. 2300, No. 900, MCF 88, No. 33, No. 40, No. 45, No.52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Mogul E, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Pigments for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment yellow 98, C.I. Pigment Yellow 109, C.I. Pigment Yellow 110, C.I. Pigment Yellow 114, C.I. Pigment Yellow 128, C.I. Pigment Yellow 129, C.I. Pigment yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 139.

Pigments for orange inks include C.I. Pigment Orange 64, and C.I. Pigment Orange 73. Pigments for magenta inks include C.I. Pigment Red 5, C.I. Pigment Red 7, C.I. Pigment Red 12, C.I. Pigment Red 48 (Ca), C.I. Pigment Red 48 8 (Mn), C.I. Pigment Red 57 (Ca), C.I. Pigment Red 57:1, C.I. pigment Red 112, C.I. Pigment Red 122, C.I. Pigment Red 123, C.I. Pigment Red 168, C.I. Pigment Red 184, C.I. Pigment Red 202, C.I. Pigment Red 176, C.I. Pigment Red 254, C.I. Pigment Red 255, C.I. Pigment Red 272, C.I. Pigment Red 254, C.I Pigment Violet 19.

Pigments for cyan inks include C.I. Pigment Blue 1, C.I. Pigment Blue 2, C.I. Pigment Blue 3, C.I. Pigment Blue 15:2, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, C.I. Vat Blue 60

Pigments for green inks include C.I. Pigment Green 3 and C.I Pigment Green 7.

Pigments for violet inks include C.I. Pigment Violet 23 and C.I. Pigment Violet 37.

Pigments for white inks include C.I. Pigment White 6.

Preferably, the organic pigment is selected from C.I. Pigment Yellow 83, C.I. Pigment Yellow 138, C.I. Pigment Yellow 139, C.I. Pigment Yellow 150, C.I. Pigment Yellow 151, Pigment Yellow 154, C.I. Pigment Yellow 155, C.I. Pigment Yellow 185, C.I. Pigment Orange 43, Pigment Orange 64, C.I. Pigment Orange 73, C.I. Pigment Red 122, C.I. Pigment Red 176, C.I. Pigment Red 254, C.I. Pigment Red 255, C.I. Pigment Red 272, C.I. Pigment Blue 15:3, C.I. Pigment Blue 15:4, C.I. Pigment Green 7, C.I. Pigment Violet 19, C.I. Pigment Violet 23, Pigment Black 7, and carbon black.

When the colourant is a pigment, the pigment may be in the form of a dispersion in the composition. The pigment dispersion may comprise a dispersant or one or more of the monomer components that is present in the ink.

The colorant may be an oil soluble dye.

Examples of yellow dyes include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Examples of magenta dyes include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Examples of cyan dyes include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

Preferably the colourant is present in between 1 to 25 wt % based on total weight of the ink composition, more preferably 1.5 to 15 wt %, and most preferably 2 to 8 wt % based on total weight of the ink composition.

Preferably, the colourant is present in less than 25 wt % based on total weight of the ink composition, more preferably less than 15 wt % and even more preferably less than 10 wt %.

Preferably, the colourant is present in greater than 1 wt % based on total weight of the ink composition, preferably greater than 1.5 wt %, and even more preferably greater than 2 wt %.

The colourant may be present in an amount that is in a range with the upper and lower limits selected from the amounts described above.

Oligomers

The ink composition of the invention may further comprise an oligomer.

In some cases the oligomer is polymerizable. That is, the oligomer contains functional groups that can undergo polymerization. Preferably, the oligomer is UV curable.

In this way, the cure of the ink may be improved.

Suitable UV curable oligomers for use in the inks of the invention include urethane acrylates, polyester acrylates, polyether acrylates, epoxy acrylates and acrylic acrylates. Preferably, the oligomer is a polyether acrylate such as an aminated polyether acrylate (e.g. Ebecryl Leo 10552). In the case of animated polyether acrylates the same compounds provides both an oligomer and an amine compound to the ink composition.

Preferably, the oligomer has a molecular weight, such as a weight average molecular weight (Mw), of 200 to 50,000, more preferably 300 to 5,000, more preferably 500 to 3,000 and even more preferably 500 to 2,000.

Preferably, the oligomer is present in less than 25 wt % based on total weight of the ink composition, more preferably less than 15 wt % and even more preferably less than 10 wt %.

Preferably, the oligomer is present in greater than 1 wt % based on total weight of the ink composition, preferably greater than 2 wt %, and even more preferably greater than 5 wt %.

The oligomer may be present in an amount that is in a range with the upper and lower limits selected from the amounts described above.

Additives

The ink composition and/or the printed deposit may contain additional components, such as are common in the art (see for example EP2070998 and EP1788045).

The ink composition and/or the printed deposit may further comprise one or more stabilisers (e.g. photostabilizers), preservatives (e.g. antioxidants, anti-aging agents), humectants, surfactants, conductivity salts, wetting agents, surface treatment agents, adhesion promotion additives, dispersants, tackifiers, biocides, antiseptics, crosslinking promoters, polymerization inhibitors, plasticizers, pH adjusters, anti-foaming agents, and mixtures of two or more thereof. Preferably, the ink composition further comprises one or more stabilisers (e.g. photostabilizers), conductivity salts or wetting agents.

Stabilisers

Preferably, the ink composition and/or the printed deposit further comprises a stabiliser.

It is proposed that, in some cases the jetting performance of an inkjet ink is dependent on its viscosity. Undesired free radical polymerisation, for example of the acrylate or vinyl ether groups, can lead to a viscosity increase. A stabiliser may be used to prevent undesired free radical polymerisation, for example the stabiliser may acts as a polymerisation inhibitor to avoid even low levels of free radical polymerisationin the ink during storage or before use.

Suitable stabilisers include p-methoxy phenol (MEHQ), butylated hydroxy toluene (BHT), quinone methide, cupferron-Al, and TEMPO.

Preferably, a stabiliser is present at from 0.1 to 5 wt % based on total weight of the ink composition.

Conductivity Additives

For continuous inkjet applications the ink composition and/or the printed deposit may further comprise a conductivity additive. The conductivity additive may be any organic salt known in the art.

Conductivity additives for ink compositions are well-known in the art.

Preferably, the organic salt is selected from quaternary ammonium or phosphonium salts. For example, the organic salt may be selected from tetraethylammonium chloride, tetraethylammonium bromide, tetrabutylammonium chloride, tetrabutylammonium bromide, tetrabutylammonium acetate, tetrabutylammonium nitrate, tetrabutylammonium tetrafluoroborate, tetrabutylammonium hexafluorophosphate, tetrabutylphosphonium chloride and tetrabutylphosphonium bromide. A preferred salt is tetrabutylammonium bromide.

Preferably, a conductivity additive is present at from 0.1 to 5 wt % based on total weight of the ink composition.

Wetting Agents

The ink composition and/or the printed deposit may further comprise a wetting agent.

Wetting agents for ink compositions are well-known in the art. The wetting agent may be a silicone based wetting agent, for example a silicone polyether acrylate wetting agent such as TEGO Rad 2300.

Preferably, a wetting agent is present at from 0.1 to 5 wt % based on total weight of the ink composition, more preferably at from 1 to 2 wt % based on the total weight of the ink composition.

Humectants

The ink composition and/or the printed deposit may further comprise a humectant.

Suitable humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol, dipropylene glycol, polypropylene glycol, glycerol, 1,2,6-hexanetriol, sorbitol, 2-pyrrolidone, 2-propanediol, butyrolacetone, tetrahydrofurfuryl alcohol and 1,2,4-butanetriol and mixtures of two or more thereof. Preferably the humectant is selected from a group consisting of glycerol, tetrahydrofurfuryl alcohol, polypropylene glycol and mixtures of two or more thereof.

The ink composition may comprise approximately a 1:1 ratio of humectant to solvent.

The ink composition may comprise up to 30 wt % of humectants in total based on the total weight of the composition. More preferably, the ink composition comprises up to 20 wt % of humectants in total based on the total weight of the composition.

Preservatives

The ink composition and/or the printed deposit may further comprise a preservative. The preservative may be an antioxidant or an anti-aging agent.

Suitable preservatives include sodium benzoate, benzoic acid, sorbic acid, potassium sorbate, calcium sorbate, calcium benzoate, methylparaben and mixtures of two or more thereof. The preferred preservative is sodium benzoate.

The ink composition may comprise up to 2 wt % of preservative based on the total weight of the composition. More preferably, the ink composition comprises up to 1 wt % of preservative based on the total weight of the composition.

Surfactants

The ink composition and/or the printed deposit may further comprise a surfactant.

Suitable surfactants include anionic, cationic or non-ionic surfactants and mixtures of two or more thereof. Non-limiting examples of anionic surfactants include alkyl sulphate, alkylaryl sulfonate, dialkyl sulfonate, dialkyl sulphosuccinate, alkyl phosphate and polyoxyethylene alkyl ether sulphate. Non-limiting examples of cationic surfactants include alkylamine salt, ammonium salt, alkylpyridinium salt and alkylimidazolium salt. Non-limiting examples of non-ionic surfactants include polyoxyethylene alkyl ether, polyoxyethylene alkylaryl ether, sorbitan fatty acid ester, polyoxyethylene sorbitan fatty acid ester, polyoxyethylene sorbitol fatty acid ester, glycerine fatty acid ester, a fluorine-containing non-ionic surfactant and a silicon-containing non-ionic surfactant. Mixtures of two or more surfactants may be used.

The ink composition may comprise up to 5 wt % of surfactant based on the total weight of the composition. More preferably, the ink composition comprises up to 1 wt % of surfactant based on the total weight of the composition.

Tackifier

The ink composition and the printed deposit may further comprise a tackifier.

In some cases the tackifier may be a binder; preferably, when the tackifier is a binder it is used in combination with a co-binder. In some cases, the tackifier is a non-film forming polymer. In some cases, the tackifier may be used in combination with other polymers to produce the desired properties.

Suitable tackifiers include resins such as rosins, terpenes and modified terpenes, aliphatic, cycloaliphatic and aromatic resins, terpene phenolic resins and silicone or mineral oils. Preferably the tackifiers are a terpene phenolic resin and/or an ester of hydrogenated rosin. Most preferably the tackifier is a terpene phenolic resin.

The ink composition may comprise from 0.3 to 10 wt % of tackifier based on the total weight of the composition. More preferably, the ink composition comprises from 1 to 5 wt % of tackifier based on the total weight of the composition.

Adhesion Promoter

The ink composition and the printed deposit may further comprise an adhesion promoter.

An adhesion promotor is a substance which acts to promote adhesion of the ink composition to a substrate.

Suitable adhesion promotors are titanium phosphate complex, titanium acetylacetonate, triethanolamine zirconate, zirconium citrate, zirconium propanoate, organosilicon, polyketones binders, polyesters binders, or a ketone condensation resin.

Preferably the adhesion promoter is a titanium phosphate complex or a ketone condensation resin. More preferably, the adhesion promotor is a ketone condensation resin.

Dispersant

The ink composition and the printed deposit may further comprise a pigment dispersant.

A dispersant is a substance which promotes dispersion of a component of the ink composition, for examples promotes dispersion of a pigment.

Suitable dispersants include ionic and non-ionic dispersants. Preferably the dispersant is an acrylic block co-copolymer.

The dispersant may be pre-mixed with the colourant for example the pigment.

The dispersant may be selected according to the nature of the colourant. The amount of dispersant is preferably from 2 wt % to 200 wt % based on the weight of pigment in the ink composition.

Methods and Uses

The ink compositions are formulated by combining the components using methods known in the art.

The present disclosure further provides a method for printing markings on a substrate. The ink compositions of the invention may be printed using an inkjet printer, the method comprising the steps of directing a stream of droplets of the ink composition to a substrate and curing the printed ink composition, for example, by treating the printed ink composition to UV radiation.

Preferably, the inkjet printer is a drop on demand inkjet printer, such as a piezo electric drop on demand inkjet printer. In some preferable cases the inks are applied to the substrate using a high resolution drop on demand printer capable of emitting a range of droplet sizes below 20 pl volume.

Once applied to the substrate, the inks of the current invention are cured. The curing process promotes the polymerization of the monomers in the ink composition to provide a printed deposit. The curing process may be initiated by the phosphine oxide initiator, alone or in combination with any additional initiators.

In some cases the curing process is carried out by the application of actinic radiation, or by the use of an electron beam.

Preferably, the curing process is a UV curing process. The UV curing process may comprise a single application of UV radiation or multiple applications of UV radiation. In some cases, the UV curing process comprises two applications of UV radiation.

In some cases, the first (or only) application of UV radiation is provided by an LED. The LED preferably emits within the range 365 nm and 405 nm.

Preferably, the first application of UV radiation provides a dose of 395 nm light delivered at from 20 to 500 mJ/cm$^2$, and more preferably at from 50 to 200 mJ/cm$^2$ (measured as UVA2 using an EIT Power Puck).

Preferably, the first application of UV radiation occurs immediately after printing, for example using an LED positioned immediately adjacent to the print head. In this way, the ink is at least partially cured immediately after printing and further spreading of the ink across the substrate is prevented.

In some cases, the first application of UV radiation is sufficient to cure the ink.

In other cases, additional applications of UV radiation are required. This is particularly the case at high printing speeds for example print speed print speeds up to 50 m/min, more preferably 75 m/min. In these cases, the additional application of UV radiation is preferably provided by a mercury arc source. For the additional application of UV radiation the dose of UVA is preferably from 30 to 1000 mJ/cm$^2$ and more preferably from 50 to 300 mJ/cm$^{2+}$ (measured with an EIT Power Map).

In a further embodiment, printing is carried out using a multi-pass inkjet printer. In this case, a UV light source, preferably an LED, is mounted on the printhead carriage. In this way, the UV light may be applied after each successive row of printing.

Substrate

The present disclosure provides a method for printing markings on a substrate. Any suitable substrate may be printed in accordance with the invention.

Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

The ink composition of the present invention is particularly suitable for printing on non-porous material, for example, non-porous materials used for food packaging.

In many cases the substrate will be a plastic film, paper or paperboard.

Suitable examples of plastic films include films comprising polyethylene, polypropylene, polyester, polyamide, PVC, polylactic acid, or cellulosic films. The plastic film may be pretreated or coated, for example to improve the adhesion of the inks or to render it more suitable for the application in question.

Preferably the paper or plastic substrates are labels.

Metallic films such as those used for lidding applications, glass and ceramics may also be printed.

Advantageously, using the compositions and methods described herein overcomes and/or mitigates at least some of the problems described above, providing an improved quality print.

Definitions

As used herein the term printed deposit refers to the ink composition after it has been printed onto a suitable substrate and cured. That is the ink composition of the present invention wherein at least some of benzyl acrylate and any other monomers present in the ink composition are polymerized to form a film.

As used herein the term ink composition includes an ink composition suitable for use in any kind of printing, for example in inkjet printing. The ink composition is typically in the form of a liquid.

As used herein the term polymer refers to any substance having a repeat unit.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure. and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example.

EXAMPLES

The following non-limiting examples further illustrate the present invention.

All commercial chemicals were used as bought from the suppliers unless otherwise stated.

Benzyl acrylate was obtained from Kowa under product code Viscoat 160.

Carbon black was obtained from Cabot Corporation under product code Mogul E. 1,6-hexanediol diacrylate (HDDA) was obtained from Sartomer under product code SR238.

Omnirad 819 is a phenylbis(2,4,6-trimethylbenzoyl) phosphine oxide containing photoinitiator. Omnirad 819 was obtained from iGM Resins.

Omnirad TPO-L is an ethyl (2,4,6-trimethylbenzoyl)phenylphosphinate containing photoinitiator. Omnirad TPO-L was obtained from iGM Resins.

Ebecryl LEO 10552 was obtained from Allnex.
Esacure 1001M was obtained from iGM Resins.
Esacure KIP160 was obtained from iGM Resins.
Omnipol BL 728 was obtained from iGM Resins.
TegoRAD 2300 was obtained from Evonik.

Testing Methods

Viscosity Measurements

The viscosity of each sample was measured at 42° C. and 25° C., to replicate the typical jetting temperature of a printer such as piezo electric drop on demand ink jet printer and room temperature.

All samples were analysed using a Brookfield LVDV-II viscometer.

Surface Cure and Adhesion Testing

Films of each sample were prepared using a standard drawdown kit with K bar. The thickness of the film was dependant on the substrate used.

For the porous substrate (paper BJ995 by Avery Dennison), a film of 8 µm was produced. For the non-porous substrate (PP foil also supplied by Avery Dennison) a 12 µm film was used.

The drawdown was cured using a Baldwin mercury lamp model CA300 (arc lamp) and a Phoseon 20 W LED lamp model FP300 225×20WC395. The arc lamp was fixed at 60% power, while the LED lamp was operated at 50% of overall power. The print slide was used to cure a film of each sample at 30, 50 and 75 m/min.

Once cured, each sample was tested for surface cure using the "thumb-twist" test. This method assigns a value of (1-5) to a sample after the test, depending on the degree of curing, where one would indicate poor surface cure and five excellent. The test is performed by pressing the thumb firmly on the surface of the cured film and twisting the thumb. The surface of the ink film is then assessed for deformation, or film damage. A summary of the scoring system for surface sure is shown in Table 1:

TABLE 1

Scoring system for the surface cure evaluation

| Score | Description |
|---|---|
| 5 | fully cured |
| 4 | surface smudges with thumb twist |
| 3 | surface smudges running finger over print |
| 2 | "fingerprint" left when touching surface |
| 1 | surface completely uncured |

Each sample was then tested using the cross-hatch adhesion method, in accordance to ISO-standards. The evaluation was carried out using ISO 2409 tape supplied by Elcometer.

Once again, this test assigns the sample a value of (1-5) to a sample after the test, based on the amount of the film removed from the substrate. The greater the removal from the substrate, the worse the adhesion and as such, the lower the score. A summary of the scoring system for adhesion is shown in Table 2:

TABLE 2

Adhesion scoring based on percentage of ink removed

| Adhesion Rating | Ink removed % |
|---|---|
| 1 | >75 |
| 2 | >50 ≤ 75 |
| 3 | >25 ≤ 50 |
| 4 | >0 ≤ 25 |
| 5 | 0 |

Example 1—Preparation of Ink Samples

Ink formulations were produced in 45 g batches. All components of the formulation, except for the pigment dispersion and the surfactant, were weighed into opaque centrifuge tubes and shaken for 45 minutes, at a speed of 200 rpm, to ensure complete dissolution of all photo-initiators. The dissolution was determined by the presence of a clear varnish, observed in all nine samples. The pigment dispersion and surfactant were added and allowed to shake for a further 45 minutes at 200 rpm.

The composition of the inks produced is provided below in Table 3, with the weight percent of each component given.

The carbon black dispersion used in each of the examples inks was preparing by mixing Mogul E (carbon black obtained from Cabot Corporation) with UV diluent, dispersant and UV stabiliser. The amount of mogul black in the carbon black dispersion was 45 wt % based on total weight of the carbon black dispersion. The same carbon back dispersion was used in each example.

TABLE 3

Composition of ink formulations

| Component wt % | Ink # 1 | 2 | 3 | 4 | 5 | 6 | 7 | 8 | 9 |
|---|---|---|---|---|---|---|---|---|---|
| HDDA | 46.3 | 44.6 | 49.1 | 20.3 | 18.6 | 23.1 | 70.3 | 68.6 | 73.1 |
| Benzyl Acrylate | 24.0 | 24.0 | 24.0 | 50.0 | 50.0 | 50.0 | 0.0 | 0.0 | 0.0 |
| Ebecryl LEO 10552 | 6.6 | 6.6 | 6.6 | 6.6 | 6.6 | 6.6 | 6.6 | 6.6 | 6.6 |
| Omnirad 819 | 3.8 | 5.5 | 1.0 | 3.8 | 5.5 | 1.0 | 3.8 | 5.5 | 1.0 |
| Esacure 1001M | 1.6 | 1.6 | 1.6 | 1.6 | 1.6 | 1.6 | 1.6 | 1.6 | 1.6 |
| Esacure KIP160 | 5.5 | 5.5 | 5.5 | 5.5 | 5.5 | 5.5 | 5.5 | 5.5 | 5.5 |
| Omnirad TPO-L | 3.0 | 3.0 | 3.0 | 3.0 | 3.0 | 3.0 | 3.0 | 3.0 | 3.0 |
| Omnipol BL 728 | 1.0 | 1.0 | 1.0 | 1.0 | 1.0 | 1.0 | 1.0 | 1.0 | 1.0 |
| Carbon Black Dispersion | 6.7 | 6.7 | 6.7 | 6.7 | 6.7 | 6.7 | 6.7 | 6.7 | 6.7 |
| TegoRAD 2300 | 1.5 | 1.5 | 1.5 | 1.5 | 1.5 | 1.5 | 1.5 | 1.5 | 1.5 |

Example 2—Testing Inks

Each of the inks produced in Example 1 were subsequently tested for viscosity as outlined above at two temperatures. The inks were also tested for surface cure and adhesion as outlined above on a variety of substrates. The results of these experiments are provided in Tables 4 and 5 below.

In Table 4 and 5, "(L)" refers to low content of the component, "(M)" refers to medium content of the component and "(H)" refers to high content of the component. "Conc." refers to the wt % of the component based on the total weight of the composition and corresponds to the value provided in Table 3 above. These values are repeated here for reference only. For each substrate the um value in parenthesis is the thickness of the film deposited on the substrate and the "m/min" value is the cure speed (discussed above under "Testing Methods").

TABLE 4

Ink Testing Results 1

| Ink # | Conc. Omnirad 819 (%) | Conc. Benzyl Acrylate (%) | Viscosity 42° C. | Viscosity 25° C. | Porous substrate (8 μm) 30 m/min Surface Cure | Porous substrate (8 μm) 30 m/min Adhesion Score | PP film (12 μm) 30 m/min Surface Cure | PP film (12 μm) 30 m/min Adhesion Score |
|---|---|---|---|---|---|---|---|---|
| 1 | 3.8 (M) | 24 (M) | 6.9 | 12.0 | 4 | 5 | 5 | 4 |
| 2 | 5.5 (H) | 24 (M) | 8.4 | 17.3 | 5 | 5 | 5 | 5 |
| 3 | 1 (L) | 24 (M) | 6.8 | 11.8 | 5 | 5 | 5 | 4 |
| 4 | 3.8 (M) | 50 (H) | 5.3 | 8.6 | 4 | 5 | 4 | 4 |
| 5 | 5.5 (H) | 50 (H) | 6.2 | 10.2 | 4 | 4 | 4 | 4 |
| 6 | 1 (L) | 50 (H) | 5.5 | 8.6 | 2 | 5 | 5 | 4 |
| 7 | 3.8 (M) | 0 (L) | 10.0 | 17.7 | 5 | 5 | 5 | 5 |
| 8 | 5.5 (H) | 0 (L) | 10.6 | 18.3 | 4 | 5 | 5 | 5 |
| 9 | 1 (L) | 0 (L) | 9.7 | 15.6 | 4 | 4 | 5 | 5 |

TABLE 5

Ink Testing Results 2

| Ink # | Conc. Benzyl Acrylate (%) | Porous substrate (8 μm) 50 m/min Surface Cure | Porous substrate (8 μm) 50 m/min Adhesion Score | PP Film (12 μm) 50 m/min Surface Cure | PP Film (12 μm) 50 m/min Adhesion Score | Porous substrate (8 μm) 75 m/min Surface Cure | Porous substrate (8 μm) 75 m/min Adhesion Score |
|---|---|---|---|---|---|---|---|
| 1 | 24 (M) | 5 | 4 | 4 | 4 | 5 | 5 |
| 2 | 24 (M) | 5 | 4 | 5 | 4 | 5 | 4 |
| 3 | 24 (M) | 4 | 4 | 5 | 4 | 2 | 4 |
| 4 | 50 (H) | 4 | 5 | 4 | 5 | 2 | 5 |
| 5 | 50 (H) | 3 | 5 | 4 | 4 | 4 | 5 |
| 6 | 50 (H) | 1 | N/R | 1 | N/R | 1 | N/R |
| 7 | 0 (L) | 5 | 5 | 5 | 4 | 5 | 4 |
| 8 | 0 (L) | 4 | 5 | 5 | 4 | 5 | 4 |
| 9 | 0 (L) | 2 | N/R | 5 | 4 | 3 | 4 |

The score 'N/R' indicates that the adhesion was so poor a result could not be recorded for these samples.

In the examples of the invention (example 1 to 3; medium benzyl acrylate content), the surface sure and adhesion is high for all types of substrate. For the comparative examples (examples 4 to 9) having low or high benzyl acrylate content, the results are varied and less reliable inks are produced.

For example 3 on the porous substrate at a cure speed of 75 m/min the surface sure is comparable to the corresponding 'low benzyl acrylate' example (example 9) and higher than the 'high benzyl acrylate' example (example 6).

The invention claimed is:

1. An ink composition comprising a phosphine oxide initiator, at least one additional initiator, and benzyl acrylate, wherein:
   the amount of benzyl acrylate is less than 40 wt % based on the total weight of the ink composition and the total amount of mono-functional monomers is less than 45 wt % based on the total weight of the ink composition; wherein
   the phosphine oxide initiator is a bis-acyl phosphine oxide, a benzoyl alkyl phosphinate, or a mixture thereof; and wherein
   the additional initiator is selected from the group comprising
   a difunctional ketosulphone of formula (I):

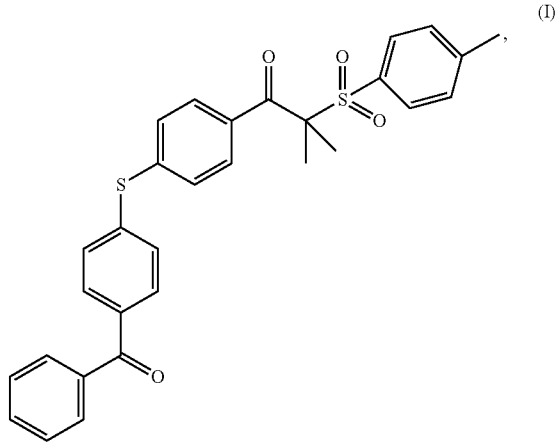 [SMILES: Cc1ccc(S(=O)(=O)C(C)(C)C(=O)c2ccc(Sc3ccc(C(=O)c4ccccc4)cc3)cc2)cc1]

a di-ester of carboxymethoxy thioxanthone,
   a difunctional alpha hydroxyl ketone of formula (III);

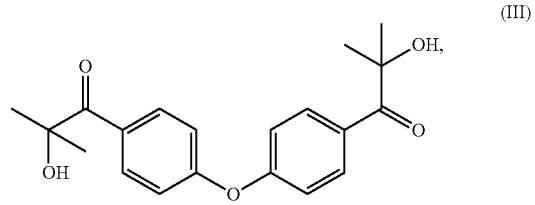 [SMILES: CC(C)(O)C(=O)c1ccc(Oc2ccc(C(=O)C(C)(C)O)cc2)cc1]

or mixtures thereof.

2. The ink composition of claim 1 wherein the benzyl acrylate is present at from 10 to 35 wt % based on the total weight of the ink composition.

3. The ink composition of claim 1, wherein the phosphine oxide initiator is a dibenzoyl phosphine oxide, a benzoyl alkyl phosphinate, or a mixture thereof.

4. The ink composition of claim 3 wherein the phosphine oxide initiator is a combination of phenylbis(2,4,6 trimethylbenzoyl) phosphine oxide and ethyl (2,4,6-trimethylbenzoyl)phenylphosphinate.

5. The ink composition of claim 3 wherein the phosphine oxide initiator is phenylbis(2,4,6 trimethylbenzoyl) phosphine oxide.

6. The ink composition of claim 1, wherein the phosphine oxide initiator is present at 3 to 10 wt % based on the total weight of the ink composition.

7. The ink composition of claim 1, further comprising a multi-functional monomer and/or a colorant.

8. The ink composition of claim 7, wherein the multi-functional monomer is a multi-functional acrylate.

9. The ink composition of claim 7, wherein the multi-functional monomer is present at 60 to 70 wt % based on the total weight of the ink composition.

10. The ink composition of claim 7, wherein the colorant is a pigment.

11. The ink composition of claim 10, wherein the pigment is selected from the group consisting of C.I. Pigment Yellow 83, C.I. Pigment Yellow 138, C.I. Pigment Yellow 139, C.I. Pigment Yellow 150, C.I. Pigment Yellow 151, Pigment Yellow 154, C.I. Pigment Yellow 155, C.I. Pigment Yellow 185, C.I. Pigment Orange 43, Pigment Orange 64, C.I. Pigment Orange 73, C.I. Pigment Red 122, C.I. Pigment Red 176, C.I. Pigment Red 254, C.I. Pigment Red 255, C.I. Pigment Red 272, C.I. Pigment Blue 15:3, C.I. Pigment Blue 15:4, C.I. Pigment Green 7, C.I. Pigment Violet 19, C.I. Pigment Violet 23, Pigment Black 7, and carbon black.

12. The ink composition of claim 7, wherein the colorant is present at 1 to 25 wt % based on total weight of the ink composition.

13. The ink composition of claim 1, further comprising an amine compound and/or an oligomer.

14. The ink composition of claim 13, wherein the amine compound is an amine acrylate.

15. The ink composition of claim 13, wherein the oligomer is a polyether acrylate.

16. A printing method comprising the steps of providing an ink container containing the ink composition as defined in claim 1; ejecting droplets of the ink composition and depositing droplets onto a substrate.

17. A substrate comprising a printed deposit produced by the method defined in claim 16.

18. The ink composition of claim 8, wherein the multi-functional acrylate is hexanediol diacrylate.

19. The ink composition of claim 14, wherein the amine acrylate is an amine functional acrylate oligomer.

20. The ink composition of claim 15, wherein the polyether acrylate is an aminated polyether acrylate.

21. The ink composition of claim 1, wherein the total amount of said at least one additional initiator is 20 wt. % or less based on the total weight of the ink composition.

22. The ink composition of claim 1, wherein said the total amount of said at least one additional initiator is 6 to 10 wt. % based on the total weight of the ink composition.

* * * * *